US012605646B2

(12) United States Patent   (10) Patent No.: US 12,605,646 B2
Blondeau et al.   (45) Date of Patent: Apr. 21, 2026

(54) SYSTEM FOR JUDGING OR DETERMINING POSITION ON A CROSSING LINE OF A SPORTING COMPETITION, AND METHOD FOR ACTIVATING SAME

(71) Applicant: Swiss Timing Ltd, Corgemont (CH)

(72) Inventors: Fabien Blondeau, Chezard-St-Martin (CH); Christophe Grasso, Bienne (CH); Benoit Cosandier, Le Locle (CH); Stéphane Pointet, Reconvilier (CH)

(73) Assignee: Swiss Timing Ltd, Corgemont (CH)

( * ) Notice: Subject to any disclaimer, the term of this patent is extended or adjusted under 35 U.S.C. 154(b) by 458 days.

(21) Appl. No.: 17/317,958

(22) Filed: May 12, 2021

(65) Prior Publication Data

US 2022/0001294 A1   Jan. 6, 2022

(30) Foreign Application Priority Data

Jul. 2, 2020   (EP) .................................... 20183708

(51) Int. Cl.
| | |
|---|---|
| *A63K 3/00* | (2006.01) |
| *G06N 3/08* | (2023.01) |
| *G06N 20/00* | (2019.01) |
| *G06T 7/73* | (2017.01) |
| *G07C 1/24* | (2006.01) |

(52) U.S. Cl.
CPC ................. *A63K 3/00* (2013.01); *G06N 3/08* (2013.01); *G06N 20/00* (2019.01); *G06T 7/73* (2017.01); *G07C 1/24* (2013.01); *G06T 2207/20081* (2013.01); *G06T 2207/20084* (2013.01);

(Continued)

(58) Field of Classification Search
CPC ... A63K 3/00; G06T 7/73; G06T 2207/20081; G06T 2207/20084; G06N 20/00; G06N 3/08; G07C 1/24
See application file for complete search history.

(56) References Cited

U.S. PATENT DOCUMENTS

| | | | |
|---|---|---|---|
| 2015/0015675 A1* | 1/2015 | Richard .................. | G04F 10/00 348/48 |
| 2017/0208350 A1* | 7/2017 | Herrick ............ | H04N 21/23439 |

(Continued)

FOREIGN PATENT DOCUMENTS

WO   WO 2019/079818 A1   4/2019

OTHER PUBLICATIONS

Peeters, Kim; Horse Racing Sports Timing Systems, Aug. 19, 2019, TimeTronics BVBA, 2019v1, pp. 1-8 (Year: 2019).*

(Continued)

*Primary Examiner* — David Perlman
(74) *Attorney, Agent, or Firm* — Oblon, McClelland, Maier & Neustadt, L.L.P.

(57) ABSTRACT

A system for judging or determining position or posture, and/or a time on a line crossed by at least one competitor or racer in a sporting competition, includes at least an apparatus for taking a photograph when an intermediate line or a finishing line of the competition is crossed, the image of the photofinish type taken defining an input of the system, and a processing unit connected to the photographic apparatus to combine the photofinish image received with a processing of an algorithm using artificial intelligence for automatically placing one or more cursors on the photofinish image.

12 Claims, 2 Drawing Sheets

(52) U.S. Cl.
CPC .............. *G06T 2207/30196* (2013.01); *G06T 2207/30221* (2013.01)

(56) References Cited

U.S. PATENT DOCUMENTS

| | | | |
|---|---|---|---|
| 2017/0236029 A1* | 8/2017 | Howell ................. | G06V 20/00 382/159 |
| 2018/0053057 A1* | 2/2018 | De Souza .............. | G06V 20/41 |
| 2021/0027067 A1* | 1/2021 | Druihle ................. | G06V 20/63 |

OTHER PUBLICATIONS

FinishLynx, What is Fully Automatic Timing: https://web.archive.org/web/20191005073312/https://finishlynx.com/packages/athletics-timing-systems/ and Athletics Timing Systems: https://web.archive.org/web/20191005073204/http://www.finishlynx.com/about-us/what-is-fully-automatic-timing/ Oct. 5, 2019 (Year: 2019).*

European Search Report issued Nov. 19, 2020 in European Application 20183708.5 filed Jul. 2, 2020 (with English Translation of Categories of Cited Documents), 3 pages.

Li et al., "A High Accuracy Automatic Timing Method for Photo Finish Systems", IEEE International Conference on Progress in Informatics and Computing, IEEE, doi: 10.1109/PIC.2014.6972323, May 16, 2014, 6 pages.

* cited by examiner

Cursor

SYSTEM FOR JUDGING OR DETERMINING POSITION ON A CROSSING LINE OF A SPORTING COMPETITION, AND METHOD FOR ACTIVATING SAME

CROSS-REFERENCE TO RELATED APPLICATION

This application claims priority to European Patent Application No. 20183708.5 filed on Jul. 2, 2020, the entire disclosure of which is hereby incorporated herein by reference.

FIELD OF THE INVENTION

The invention relates to a system for automatically judging or determining position or posture and/or a time on a line crossed by at least one competitor or racer in a sporting competition.

The invention also relates to a method for activating or programming the system for judging or determining position or posture and/or a time of at least one competitor or racer in a sporting competition.

BACKGROUND OF THE INVENTION

Timing by photofinish image is well known in sporting timing and is the main device used for indisputably measuring the time performance of athletes or competitors and ranking them in sporting disciplines, such as athletics, cycling, rowing and many other disciplines. Although this technology has many advantages, such as visual representation in time, where the horizontal axis is the time, positioning the cursors on the image taken is a manual operation, which requires an operator and time for implementing this operation. The precise horizontal positioning of the cursors is a critical activity since it defines the time and the rank of the athlete or athletes. Thus, the manual or semi-manual positioning of the cursors requires time and an operator, which slows down the process for supplying results and therefore requires labour and is dependent on the performance of the operator, which constitutes a drawback.

The patent application WO 2019/079818 A1 describes a system and a method for recognising images or photographs for entering an athlete or competitor in a sporting competition. To do this, the system comprises a photographic apparatus configured to take an image or photograph of the athlete who is beginning his sporting competition. A database for the athlete is also provided, configured to record an image profile of the athlete before the beginning of the competition, and a processor (computer) configured to compare the profile of the image recorded in the database with an image or photograph of the athlete taken by the photographic apparatus. The processor enters the athlete as a participant in the sporting competition on the basis of the comparison between the image profile and the image of the start of the competition. The athlete can be easily recognised, as for a recognition by vision by a computer according to various parameters of the athlete previously stored. However, there is no description of the determination normally of a rank or a race time of each competitor at the finish or in intermediate positions during the race and continuously in real time, or the automatic placing of a cursor on a crossing line.

The patent application WO 2014/089306 A1 describes a system able to take targeted information that is generated for a participant during a sporting activity. Each image or video that represents the participant is received, and the participant is identified in the image or the video from a participant profile stored electronically in an information database on the participants of the system. The profile of the participant comprises identification information on the participant and contact information for the participant. The database of information on the participants comprises participant profiles for a plurality of participants for the sporting activity. One or more identification indices associated with each participant are identified in the image or the video, and a set of targeted information is generated on the basis of the identification information in the profile of the participant and the identification indices identified. The set of targeted information is supplied to the participant using the contact information of the profile of the participant. However, the system focuses solely on the recognition of persons, which can be used for automatic video production, but not for a same approach of recognition of physiological postures of such and such a participant to precisely identify him so as to precisely place a cursor on such and such a crossing line, in particular on the correct vertical time line of a taking of images, for example at the finish, so as to precisely determine in real time the ranking of each participant.

The patent application WO 2015/193049 A1 describes a timing system for automatically measuring in particular the intermediate and/or finishing times of the competitors during a race. It comprises a photographing camera (photofinish), centred on a finishing line or an intermediate line, and a control unit for activating the capture of line scanning images by said camera, where optical markers are provided and respectively associated with each competitor. The timing system also comprises a detection module for automatically detecting said optical markers, which makes it possible to identify each competitor and to attribute a timing result to each competitor. However, provision must be made for the use of optical markers for a detection of light at each line crossed, which inevitably complicates any data processing to be able to continuously and in real time indicate the rank of each participant associated with a race time.

SUMMARY OF THE INVENTION

The aim of the invention is therefore to overcome the drawbacks of the aforementioned prior art by proposing a system for automatically judging or determining position or posture and/or a time on a crossing line of at least one competitor or racer in a sporting competition, making it possible to provide all the information in real time on any crossing line during the race.

For this purpose, the invention relates to a system for automatically judging or determining position or posture and/or a time on a crossing line of at least one competitor or racer in a sporting competition, comprising the features defined in the below described embodiments.

Particular embodiments of the system for automatically judging or determining position or posture and/or a time on a crossing line of at least one competitor or racer in a sporting competition are defined in the below described embodiments.

One advantage of the automatic judgement or determination system lies in the fact that, by artificial intelligence, it makes it possible to recognise each competitor or racer by various physiological parameters stored in a computer memory unit. In general terms, the identification of the posture of each competitor and specifically the detection and the precise position of the determining element (torso, first part of the body) for judging the photofinish are implemented automatically by means of an automatic or deep learning program implementing an artificial intelligence model consisting of a neural network.

Advantageously, there is an automatic placing of a cursor at a crossing line, such as the finishing line. This makes it possible to save a great deal of time compared with a manual or semi-manual positioning of the cursors as previously. With the automatic placing of the cursor, it is possible to indicate in real time the rank of each competitor during the race and mainly when the finishing line is crossed.

Advantageously, a technology based on a computer vision and using artificial intelligence is used, which makes it possible to automatically recognise each participant at each crossing line crossed in order to determine in real time and continuously the ranking during a race. Each participant or competitor may be a person, an animal, a person in or on a vehicle, such as a bicycle, a car, a boat, or other.

Advantageously, with the use of artificial intelligence for recognising each competitor, it is no longer necessary to use a transponder module carried by each competitor to identify him when each crossing line is crossed. Thus, it is easier to automatically and in real time determine the time and the rank of each one when a crossing line is crossed during a sporting competition. The sporting competition may be an athletics race, a bicycle or boat race, a motor race, a horse race, a skiing or cross-country skiing race, a dog or other animal race, or other competitions where one or more participants start at the same time from a starting line. With a single participant or athlete at the start, recognition of the athlete is not necessary, but identifying the posture of the athlete for the automatic placement of a cursor on a crossing line for example remains pertinent.

Advantageously, and unlike the normal activities of recognising images in X and Y by artificial intelligence, for this present invention there is mainly recognition of each athlete in the photofinish images dependent on the time t and the axis Y.

For this purpose, the invention also relates to a method for automatically judging or determining position or posture, and/or a time on a crossing line of at least one competitor or racer in a sporting competition, comprising the features defined in the below described embodiments.

Particular steps of the method are defined in the below described embodiments.

Advantageously for the judgement or determination method, a detection of the posture of the competitor or racer can be made first of all so as to identify the point of the body or vehicle whereon it is necessary to place the cursor automatically by artificial intelligence. Subsequently the position of the cursor directly gives the precise time when the crossing line, such as the finishing line, is crossed, where the horizontal axis represents the time. In addition, according to the rules of the practised sport, the precise position of the cursor, which gives the time, makes it possible to establish a ranking in real time.

Advantageously, following the preceding steps above described for example, an identification or recognition of each participant or competitor can be made, but this is an independent function.

For this purpose, the invention also relates to a computer program, which comprises program code instructions for implementing steps of the method, when said program is executed by a processing unit of the system, as in the below described embodiments.

BRIEF DESCRIPTION OF THE DRAWINGS

The aims, advantages and features of the system or method for automatically judging or determining a position or posture and/or a time of each participant according to the invention will emerge more clearly in the following description of at least one non-limitative embodiment illustrated by the drawings, on which.

DETAILED DESCRIPTION OF THE INVENTION

In the following description, all the elements of a system for automatically judging or determining a position or posture and/or a racing time over a line crossed by each competitor in a sporting competition, which are well known to a person skilled in the art in this technical field, will be related only in a simplified manner.

Figure 1:
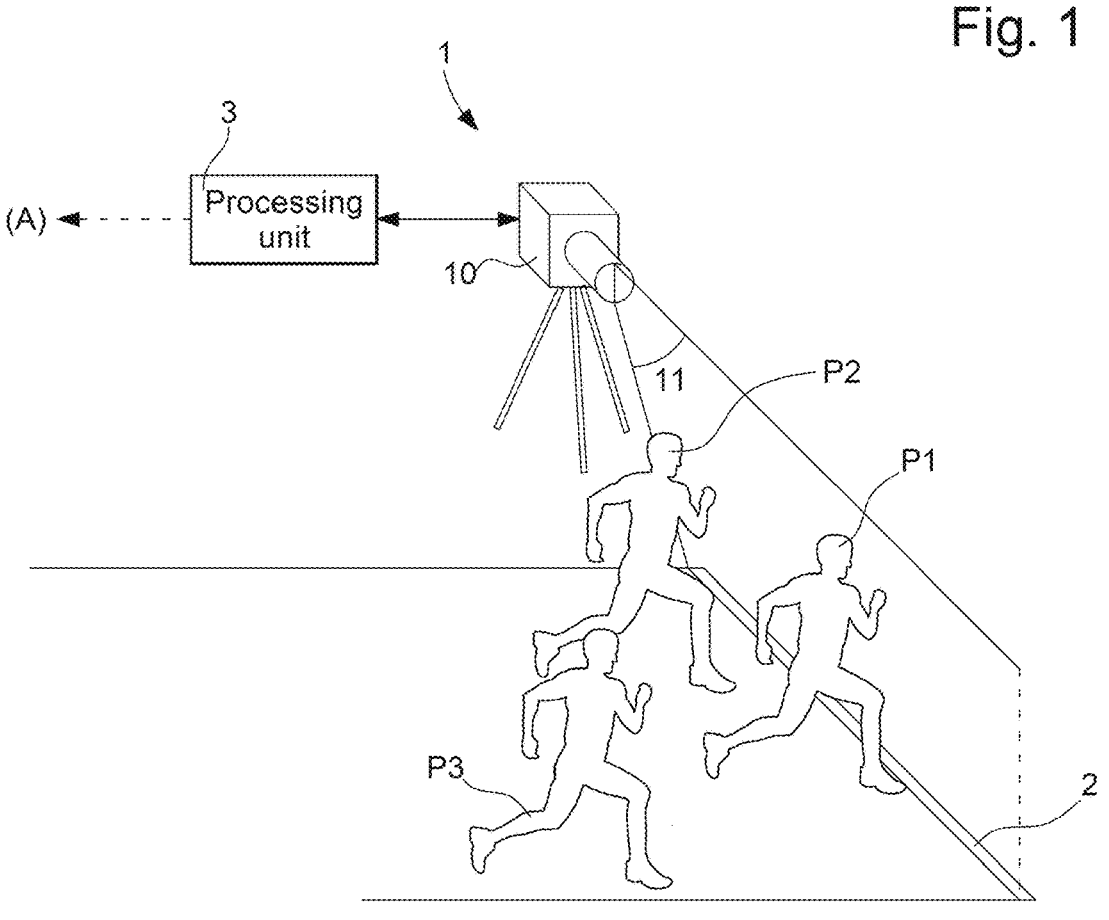
FIG. 1 shows in a simplified manner a first embodiment of a system for automatically judging or determining position or posture and/or a time, according to the invention.

As can be seen in a simplified manner in FIG. 1, the system 1 for judging or determining position or posture and/or a time of participants P1, P2, P3 in the sporting competition comprises essentially a photographic apparatus 10 and a processing unit 3 connected to the photographic apparatus 10. A communication of data or images or configuration parameters can be established between the photographic apparatus 10 and the processing unit 3. The processing unit 3 comprises in particular an image processor or a microprocessor and at least one memory explained below. The processing unit 3 may also be a computer with all the functionalities thereof.

First of all and principally, the system 1 or the method enables a processing unit 3 to be configured to implement a model for automatically placing one or more cursors on the photofinish image received by the photographic apparatus 10. This automatic placing model is generated or developed from one or more learning algorithms that are the result of artificial intelligence.

The invention relates to an automatic judgement method based on automatic learning, as well as computer vision (also referred to as artificial vision or digital vision), a branch of artificial intelligence the main aim of which is to enable a machine to analyse, process and understand one or more images taken by an acquisition system. The automatic judgement method is applied to the images acquired by photofinish, which show the time on the horizontal axis X, while the axes Y and Z define the space.

Automatic learning consists initially of estimating a model from data, referred to as observations, which are available and finite in number, during the design phase of the system. Estimating the model consists of determining the position on a line crossed by competitors or racers in a sporting competition. This so-called "learning" or "training" phase is implemented prior to the practical use of the model. The second phase is putting in production: the model being determined, new data can then be submitted in order to obtain the result corresponding to the required task. In practice, the system can pursue the learning once in production, insofar as it can obtain a return on the quality of the results produced.

In the case of the present invention for the learning or training phase, a large number of photofinish images are already judged and validated by the international federations, which facilitates the task of recognition or identification of the participants in a race. In addition, this also facilitates, and at the very outset, the automatic placing of the cursor or cursors on a crossing line.

By means of this computer vision, it is possible to recognise the athlete and his posture in the photofinish images of the finish. All this information can be given almost instantaneously, which was not the case previously, where these tasks were performed manually. Thus, it is possible to automatically indicate the rank of each competitor or racer on crossing the finishing line 2, and thereby also the race time of each competitor P1, P2, P3.

A plurality of conventional successive images can also be taken by the photographic apparatus 10, which may be a smart camera, and stored so as to successively indicate the rank of each competitor on crossing the finishing line 2. Naturally, as explained hereinafter, the system may comprise another photographic apparatus 10 disposed on another crossing line, such as an intermediate crossing line, but the principle is the same as for that of the finishing line 2.

Artificial intelligence can be defined in a simplified manner as first of all observing an object or a person or an animal at specific points on their body while taking one or more images. Subsequently, by means of an algorithm or rather a specific model stored in the processing unit 3 for example, the images taken are analysed by digitising them and weighting them according to the importance of the specific points. Finally, the result is interpreted, so that, after several learnings, it is possible to recognise or identify the object, the person or the animal, which is sought. The more learning steps are made, the more the image processor of the processing unit 3 is able to interpret and precisely recognise the object or the person P1, P2, P3 or the animal.

The concept of artificial intelligence includes among other things automatic learning or deep learning. In particular, a model is preferably spoken of to define one or more learning algorithms.

To do this, the specific learning algorithm or algorithms are trained on the basis of predetermined classes and known examples particular to a discipline or a sport. Then supervised learning (or discriminant analysis) is spoken of since the system learns to classify according to a classification or ranking model. An expert (or oracle) must label examples in advance. The process unfolds in two phases. During the first phase (off-line, referred to as learning), it is a case of determining a model from the labelled data. The second phase (on-line, referred to as testing) consists of predicting the label of a new data item, knowing the previously learnt model.

It should also be noted that, previously, for determining a time when a crossing line is crossed for each competitor, it was necessary to use a transponder module disposed on the body of each competitor or on the bicycle of the competitor or on the horse of the competitor. This transponder module provided instants when each crossing line was crossed. With the use of artificial intelligence, an image processor or microprocessor in the processing unit 3 is activated in order to provide, automatically and in real time, a position or posture and/or a race time of each competitor when a crossing line 2 is crossed.

This invention can potentially be used as a cloud computing service by sending photofinish images of the finish and in return receiving the judged image with the precisely positioned cursors, as well as the times and ranks according to the rules of the sporting discipline. Potentially any timekeeper could use any type of compatible photofinish camera and send the acquired images to a central service.

It is also possible to determine in real time a position or posture of at least one competitor P1, P2, P3 when crossing a crossing line 2 by automatically identifying or recognising each competitor following various parameters stored in a cloud computing service.

In the future, it may also be envisaged directly using, as a photographic apparatus 10, a 2D camera or photographic apparatus for obtaining this finishing photograph, given the time resolution (or number of images per second) of such apparatus, which will become ever higher.

As mentioned previously, before any sporting competition, it can be envisaged taking a plurality of photographs of each competitor while taking certain parameters thereof, such as the position of their number, or the movement of their head, shoulders, feet or knees according to the sport in question. This makes it possible to train the judgement system and to enable it to directly recognise thereafter each competitor through this pre-recorded information (artificial intelligence).

Figure 2:
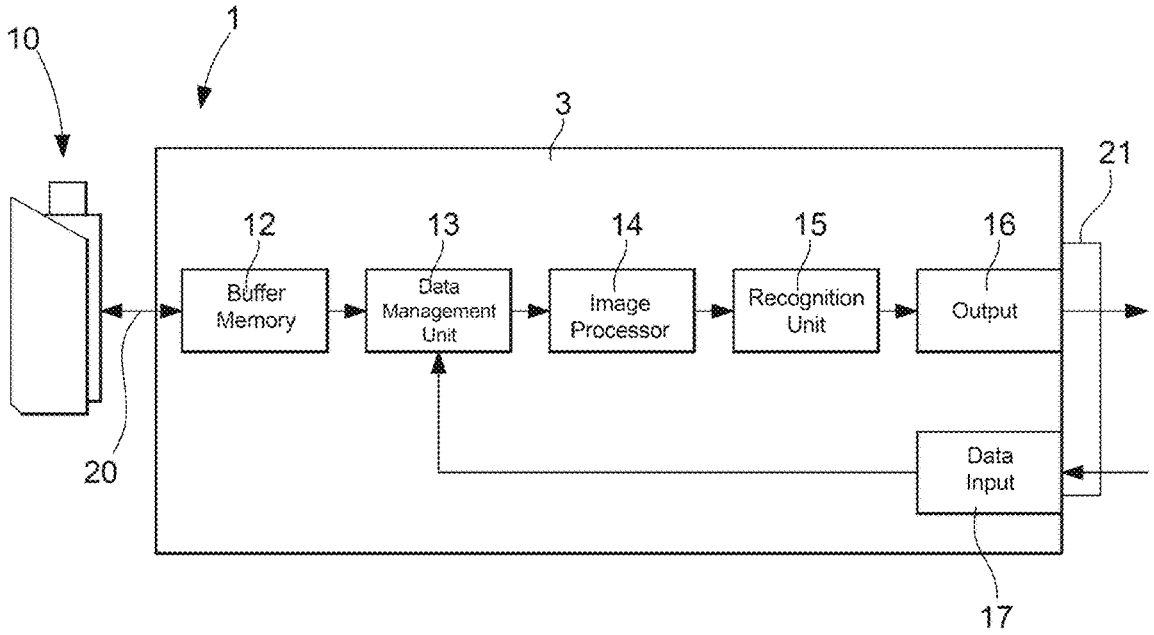
FIG. 2 shows the various components of a photographic apparatus and of a processing unit of the simplified system for automatically judging or determining position or posture, and/or a time, according to the invention.

As illustrated in more detail in FIG. 2, the system 1 for judging or determining position or time of each competitor or racer P1, P2, P3, comprises the photographic apparatus 10, which may be at least one camera unit 10, connected to the processing unit 3, which has an image processor. The processing unit 3 with image processor receives a sequence of images via the image input 20 of the photographic apparatus 10. The image input 20 is connected to an image buffer memory 12 of the image processor 3. This image buffer memory 12 is generally used as a kind of digital data storage. It can also be envisaged having the photographic apparatus 10 providing a digital output 20 to the image processor 3 in order to supply a digital data stream comprising the image sequence. The output of the image buffer memory 12 is connected to an input of a data management unit 13. The data management unit 13 can be operated to manage the digital data stored in and/or supplied by the image buffer memory 12. An output of the data management unit 13 is connected to an image preprocessor 14. The image preprocessor 14 can be used for implementing a certain type of image preprocessing predefined according to the activation of an artificial-intelligence processing algorithm. An output of the image preprocessor 14 is connected to a recognition or identification unit 15, which itself can supply a data signal to an output 16 of the processing unit 3 via a transducer 21.

It should be noted that the data management unit 13 may comprise a supplementary input optionally connected to a data input 17 of the image processor 3 of any connection in a network of processing units with image processor. However, according to the present invention, each processing unit 3 with image processor manages, independently of other connected units, the judgement or determination of a position or posture and/or of a time of each competitor for automatically placing a cursor on a specific crossing line. The data management unit 13 may be operable to manage or combine the digital data stored in and/or supplied by the image buffer memory 12 in combination with the specific data that arrived via the data input 17. According to the present invention, it may be imagined having two cameras as photographic apparatus 10, which are disposed on each side of the same crossing line, such as the finishing line, and both being synchronised with respect to time. This procures the advantage of always supplying precise information even if one or other of the cameras becomes defective.

It should be noted that this also and especially makes it possible to have another view to make the judgement (positioning of the cursor) on the basis of two different left and right views synchronised timewise. In some situations, for example in athletics, an athlete may be partially "concealed" by another on one camera, whereas he will be fully visible on the other camera.

The image preprocessor 14 and the recognition or identification unit 15 can be combined in order to implement at least one classification of images, of detection of an element, such as an object, a person or an animal, or of a semantic segmentation or estimation of the element recognised in the sequence of received images. The recognition of the unit 15 can be used to generate data specific to the element, such as its position, its orientation, its posture, the state of its movement or its trajectory of interest recognised in the sequence of images. The recognition or identification unit 15 is furthermore connected to the data output of the transducer 21. However, all the recognition or identification data or parameters in particular of a person or of an animal are stored in the processing unit 3 in a specific memory, not shown, and wherein an artificial-intelligence processing algorithm is also stored.

It should be noted that, if it is necessary to have a plurality of processing units 3 with an image processor for monitoring on a plurality of crossing lines, each processing unit 3 with image processor may be connected in a network to a central processor, not shown, for transmitting data signals A. The above description has of course been presented only for the principle of a processing unit 3 communicating through an input 20 of configuration signals from the photographic apparatus 10 or receiving image signals, for example digitised, coming from the photographic apparatus 10.

Figure 3A:
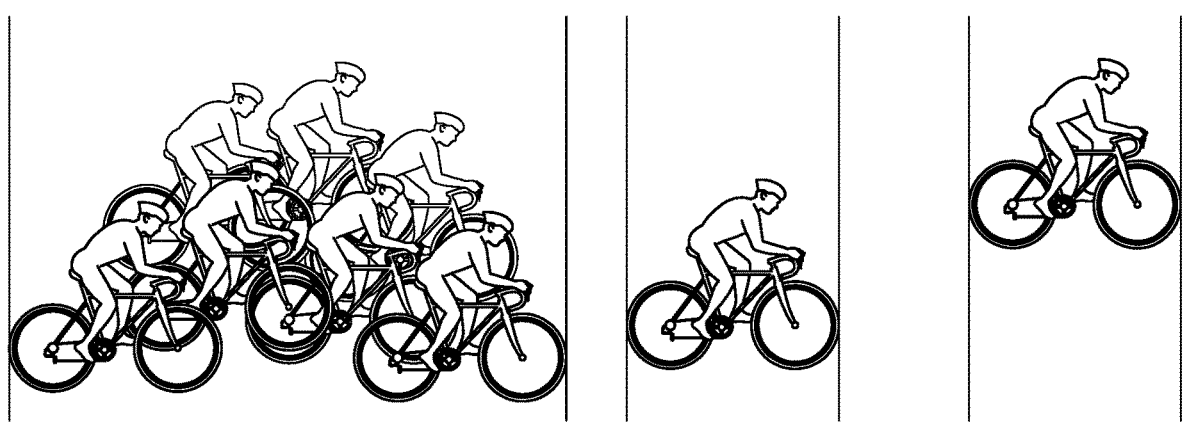
FIGS. 3a and 3b show a view of racers in a bicycle race with indication of rank of each racer before crossing the finishing line of a system for automatically judging or determining position or posture and/or a time, according to the invention.
Figure 3B:
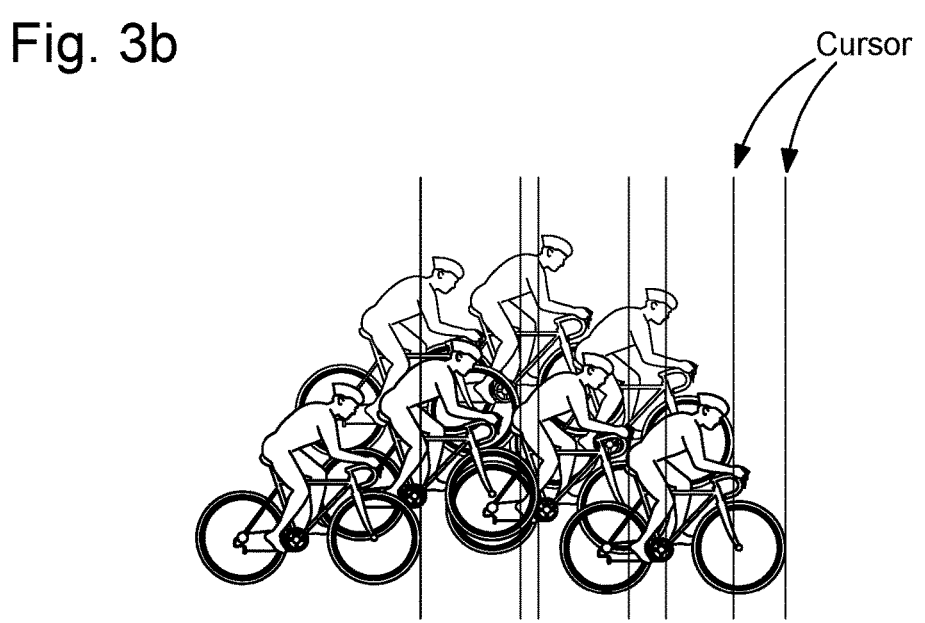

FIGS. 3a and 3b show a road bicycle race. Without showing a crossing line, it can be considered that, at the race finish and according to the number of cyclists close to each other arriving at the same time, a photograph of the finish is taken by the photographic apparatus, not shown, as a photofinish image. A photograph or video is therefore taken at the finish to precisely determine the rank of each cyclist at the finish, given that the human eye is not able to distinguish which cyclist or competitor cross the finish line first. The taking of images on the crossing line with the pixel column is to observe a precise point for determining the race time and the rank of each competitor. The time at the finish by this taking of images with a grating of pixel columns is the official final time for a competition.

Normally, one or more photofinish timing photographs (t, Y) at the finishing line are also used in other sporting races such as the road bicycle race shown here. Even with any type of electronic equipment for tracking or following the racers or competitors during a sporting competition, a photograph at the finish is considered to be necessary for determining the winner. Photographs are also especially important during races, but they are also used for assigning official times to each competitor during any race. In a cycle race on a traditional route, judgement lines are generally placed manually for each racer. This takes an average time of 2.5 seconds to do this, and the result is a time of approximately 8 minutes for judging a race peloton. The International Cycling Union defines special rules for road races as all the cyclists in the same group obtain the same time at the finish.

By means of the system for automatically judging or determining a position and/or a time of the present invention, the system makes it possible to update a general ranking when crossing the finishing line as quickly as possible by automating all the tasks that are normally performed manually. Thus, the automatic judgement or determination system must detect the first cyclist who crosses the finishing line by taking into account the crossing of the front of the front wheel. The rear of the rear wheel of the last cyclist of the various groups must also be detected. With these data, a calculation of the time interval between the cyclists is made, to determine whether a given cyclist is the first in a new group in order thus to obtain a new time as represented by the three groups in FIG. 3a. Finally, the system must be able to define the groups detected. In this case, it can be envisaged providing the cyclist each also with a personalised transponder module for giving the composition of the group.

By using artificial intelligence as explained above and following the learning by reinforcement or knowledge of stored parameters characterising each cyclist, the system can automatically detect the number of each cyclist located on his back when crossing the finishing line. In this case, no transponder module is necessary, which greatly simplifies the task of determining or judging the position of each at the finish. It must detect, as explained above, the front wheel of each cyclist on crossing the finishing line. With all these data, the system must be capable of automatically giving the complete results of the stage, that is to say the time and the composition of the groups with the position of each cyclist in each group.

It can be envisaged using, for the system, two photographic apparatuses, not shown, which are for example two photofinish cameras scanning the images sequentially over a width of one pixel of the finishing line. The two cameras are disposed on each side of the finishing line while both being synchronised timewise. A single processing unit can be able to take into account the images supplied by the two cameras by using artificial intelligence for recognising each cyclist crossing the finishing line.

As a single column of the CCD camera is read as an output associated with a time, the frame rate of each camera may be very high, for example higher than 10,000 frames per second. The vertical size of the image column is for example 2048 pixels. The quality of the image may be variable (brightness, contrast). The direction of the race may be from left to right or from right to left, which is taken into account by the judgement or determination system. If transponder modules are again used in addition for this cycle race, they are considered to be traditional recognition means, but are not necessarily necessary for the system of the present invention, which uses artificial intelligence for recognising each cyclist.

For the other racers, only the order thereof at the finish is important. The system used must be able to judge in real time as soon as the first cyclist crosses the finishing line and then more quickly than an experienced photofinish timekeeper. However, during the race, the timing remains the task of the traditional timekeeper.

In the system of the present invention, said system receives the photograph with the column of pixels of the finish, and subsequently there is a reconstruction of the image to recognise all the cyclists crossing the line. It is the front wheel that is valid for determining the time at the finish.

To predict the position of a cyclist in an image, there must be learning by the machine or by the computer of various characteristics of each racer, for example various points on their body characterising them, their number, or other characteristic. A platform is used for manually annotating the reference images in order to constitute a set of data that then serves to train an artificial intelligence module of the present invention.

The model for detecting an object specific to cycling is trained with the set of data specific to cycling. The performance of a detection model is dependent on the number of images annotated (ideally several tens or hundreds of thousands of references), the richness of the cases specific to an application and the quality of the annotations. As aforementioned, once the automatic detection has been made, determination software places the cursor on the crossing line according to the rules of the sport in question.

Starting from the description that has just been made, several variants of the system for judging or determining a position or posture and/or a competitor time in a sporting competition can be mentioned. Two photographic apparatuses can be provided, disposed on each side of the same crossing line, and providing images to a single processing unit, such as a computer managing the images of each photographic apparatus.

What is claimed is:

1. A system for judging or determining position or posture and/or a time on a crossing line of a plurality of competitors or racers in a sporting competition, the system comprising:

at least two photographic apparatuses when an intermediate line or a finishing line of the competition is crossed, at least one image of the photofinish type taken defining an input of the system, the at least two photographic apparatuses being disposed on each side of the finishing line and being synchronized with respect to time, and processing circuitry connected to the photographic apparatuses that is configured to utilize artificial intelligence based on images supplied by photographic apparatuses to recognize each competitor or racer crossing the finishing line, and configured to implement a model for automatically placing a plurality of cursors on the photofinish image received, each of the cursors being placed on a crossing line corresponding to a front most portion of a torso of the respective competitor or racer on the photofinish image such that the plurality of cursors simultaneously show a rank of each competitor or racer at a finish of the competition, wherein the processing circuitry includes an image processor that comprises an image buffer memory for receiving a sequence of images from the photographic apparatuses via an input, and the photofinish image is a reconstruction image based on the sequence of images that shows all the competitors crossing the finishing line at separate respective points in time along with the plurality of cursors corresponding respectively to each competitor within a single image according to the rank, wherein the processing circuitry is configured to determine in real time a position or posture of at least one competitor when crossing a crossing line so as to identify in particular the point on the body or on a vehicle in or on which the competitor is located, in order to be able to place the cursor automatically by artificial intelligence by determining in real time a position or posture of each competitor when crossing the finishing line by automatically identifying or recognising each competitor following reinforcement learning by an artificial intelligence model having a neural network that is trained based on annotated images of movement of the head, shoulders, feet or knees of each competitor.

2. The system according to claim 1 for a sporting competition with a plurality of competitors or racers, wherein the processing circuitry is configured to determine in real time a position, such as a rank of each competitor when crossing a crossing line.

3. The system according to claim 1, wherein the processing circuitry is configured to automatically place one or more cursors in a cloud computing service.

4. The system according to claim 1, wherein the processing circuitry comprises a data management unit connected to an output of the image buffer memory, an image preprocessor for implementing an image preprocessing predefined according to the activation of an artificial-intelligence processing algorithm, and connected to an output of the data management unit, and a recognition or identification unit connected to an output of the image preprocessor, and for providing a data signal at an output of the processing unit.

5. The system according to claim 4, wherein the image buffer memory is configured to store digital data of digitised images from the photographic apparatuses.

6. The system according to claim 4, wherein the data management unit comprises a supplementary input connected to a data input in a connection of a network of a plurality of processing units with an image processor.

7. The system according to claim 4, wherein the system comprises a plurality of processing units with an image processor for checking a plurality of crossing lines, the processing units being connected in a network to a central processor.

8. A method, implemented by a system for judging or determining position of posture and/or a time on a crossing line of at least one competitor or racer, the method comprising the steps of:

taking images of the photofinish type by at least two photographic apparatuses when an intermediate line or a finishing line of the competition is crossed, and receiving by processing circuitry the images taken by the photographic apparatuses and utilizing artificial intelligence based on the images supplied by photographic apparatuses to recognize each competitor or racer crossing the finishing line, implementation by the processing circuitry of a model for automatically placing a plurality of cursors on the photofinish image received, each of the cursors being placed on a crossing line corresponding to a front most portion of a torso of the respective competitor or racer on the photofinish image such that the plurality of cursors simultaneously show a rank of each competitor or racer at a finish of the competition, wherein the processing circuitry includes an image processor that comprises an image buffer memory for receiving a sequence of images from the photographic apparatuses via an input, and the photofinish image is a reconstruction image based on the sequence of images that shows all the competitors crossing the finishing line at separate respective points in time along with the plurality of cursors corresponding respectively to each competitor within a single image according to the rank, wherein a position or posture of at least one competitor is determined in real time when a crossing line is crossed so as to identify in particular the point on the body or on a vehicle in or on which the competitor is located, in order to be able to place the cursor automatically by artificial intelligence by determining in real time a position or posture of each competitor when crossing the finishing line by automatically identifying or recognising each competitor following reinforcement learning by an artificial intelligence model having a neural network that is trained based on annotated images of movement of the head, shoulders, feet or knees of each competitor.

9. The method according to claim 8 for a sporting competition with a plurality of competitors or racers, wherein the system determines in real time a position, such as a rank of each competitor when crossing a crossing line.

10. The method according to claim 8, wherein the system automatically places one or more cursors in a cloud computing service.

11. The method according to claim 8, wherein the system is configured to use a neural network in artificial intelligence where the data taken with their own label are the basis of learning by the neural network to recognise various categories or types of competition.

12. A non-transitory computer-readable medium that stores a computer program comprising program code instructions for implementing steps of the method according to claim 8, when said program is executed by the processing circuitry of the system.

\* \* \* \* \*